(12) United States Patent
Dawson et al.

(10) Patent No.: US 8,320,414 B2
(45) Date of Patent: Nov. 27, 2012

(54) FORMATION AND REARRANGEMENT OF LENDER DEVICES THAT PERFORM MULTIPLEXING FUNCTIONS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1400 days.

(21) Appl. No.: 11/755,779

(22) Filed: May 31, 2007

(65) Prior Publication Data

US 2008/0300889 A1     Dec. 4, 2008

(51) Int. Cl.
*H04J 3/02* (2006.01)

(52) U.S. Cl. ......... 370/539; 370/254; 709/235; 709/244

(58) Field of Classification Search ............ 370/254, 370/328, 329, 331, 338, 337, 351, 352, 401, 370/466, 537, 539; 709/223, 235, 238, 246, 709/244, 249, 203
See application file for complete search history.

(56) References Cited

U.S. PATENT DOCUMENTS

| | | | |
|---|---|---|---|
| 5,390,113 A | 2/1995 | Sampson | |
| 5,437,054 A | 7/1995 | Rappaport et al. | |
| 5,490,201 A | 2/1996 | Moberg et al. | |
| 5,953,338 A | 9/1999 | Ma et al. | |
| 5,959,975 A | 9/1999 | Sofman et al. | |
| 6,006,084 A | 12/1999 | Miller et al. | |
| 6,035,281 A | 3/2000 | Crosskey et al. | |
| 6,047,268 A | 4/2000 | Bartoli et al. | |
| 6,366,907 B1 | 4/2002 | Fanning et al. | |
| 6,396,805 B2 | 5/2002 | Romrell | |
| 6,397,061 B1 | 5/2002 | Jordan et al. | |
| 6,477,522 B1 | 11/2002 | Young | |
| 6,522,735 B1 | 2/2003 | Fortman et al. | |
| 6,653,933 B2 | 11/2003 | Raschke et al. | |

(Continued)

FOREIGN PATENT DOCUMENTS

EP     0999662     5/2005

(Continued)

OTHER PUBLICATIONS

Non-final Office Action dated Nov. 25, 2009 in U.S. Appl. No. 11/755,780.

(Continued)

*Primary Examiner* — Hassan Phillips
*Assistant Examiner* — Ajay Cattungal
(74) *Attorney, Agent, or Firm* — William Schiesser; Roberts Mlotkowski Sefran & Cole, P.C.

(57) ABSTRACT

A method comprises establishing an ad-hoc network between a borrower and at least two lenders of bandwidth and establishing one lender of the at least two lenders as a multiplexer to manage data flow over the ad-hoc network between the borrower and lenders of the at least two lenders of bandwidth. The method may include providing a computer infrastructure to perform the steps of the invention. A system is also provided which includes a server having a database containing data associated with one or more lenders and a borrower in an ad-hoc network and at least one hardware and/or software component. The system may further includes computer usable medium having readable program code embodied in the medium to perform processes of the invention.

39 Claims, 8 Drawing Sheets

U.S. PATENT DOCUMENTS

| | | |
|---|---|---|
| 6,751,196 B1 | 6/2004 | Hulyalkar et al. |
| 6,763,248 B1 | 7/2004 | Odamura |
| 6,810,428 B1 | 10/2004 | Larsen et al. |
| 6,850,764 B1 | 2/2005 | Patel |
| 6,879,574 B2* | 4/2005 | Naghian et al. ............... 370/338 |
| 6,941,378 B2 | 9/2005 | Apostolopoulos et al. |
| 6,954,616 B2 | 10/2005 | Liang et al. |
| 6,954,790 B2 | 10/2005 | Forslöw |
| 6,961,575 B2 | 11/2005 | Stanforth |
| 6,975,613 B1* | 12/2005 | Johansson ..................... 370/338 |
| 6,980,511 B1 | 12/2005 | Li |
| 6,990,113 B1 | 1/2006 | Wang et al. |
| 7,016,375 B1 | 3/2006 | Rosenberg et al. |
| 7,028,096 B1 | 4/2006 | Lee |
| 7,043,225 B1 | 5/2006 | Patel et al. |
| 7,058,014 B2 | 6/2006 | Sim |
| 7,058,387 B2 | 6/2006 | Kumar et al. |
| 7,065,367 B2 | 6/2006 | Michaelis et al. |
| 7,075,890 B2 | 7/2006 | Ozer et al. |
| 7,085,281 B2 | 8/2006 | Thomas et al. |
| 7,089,301 B1 | 8/2006 | Labio et al. |
| 7,130,283 B2 | 10/2006 | Vogel et al. |
| 7,174,385 B2 | 2/2007 | Li |
| 7,224,964 B2 | 5/2007 | Souissi et al. |
| 7,240,015 B1 | 7/2007 | Karmouch et al. |
| 7,257,632 B2 | 8/2007 | Zhang et al. |
| 7,274,658 B2 | 9/2007 | Bornstein et al. |
| 7,310,641 B2 | 12/2007 | Moore et al. |
| 7,340,759 B1 | 3/2008 | Rodriguez |
| 7,376,747 B2 | 5/2008 | Hartop |
| 7,401,153 B2 | 7/2008 | Traversat et al. |
| 7,440,573 B2 | 10/2008 | Lor et al. |
| 7,447,656 B2 | 11/2008 | Parthasarathy |
| 7,450,517 B2 | 11/2008 | Cho |
| 7,450,949 B2 | 11/2008 | Choksi |
| 7,460,549 B1 | 12/2008 | Cardei et al. |
| 7,463,890 B2 | 12/2008 | Herz |
| 7,489,656 B2 | 2/2009 | Guo et al. |
| 7,530,102 B2 | 5/2009 | Moskowitz |
| 7,546,342 B2 | 6/2009 | Li et al. |
| 7,593,333 B2 | 9/2009 | Li et al. |
| 7,609,748 B2 | 10/2009 | Karlsson |
| 7,623,524 B2 | 11/2009 | Muthukrishnan et al. |
| 7,633,908 B1* | 12/2009 | Kwong et al. ................. 370/337 |
| 7,788,133 B2 | 8/2010 | Delenda |
| 7,817,623 B2* | 10/2010 | Dawson et al. ............... 370/352 |
| 7,830,834 B2* | 11/2010 | Das et al. ...................... 370/329 |
| 2001/0027484 A1* | 10/2001 | Nishi ............................ 709/223 |
| 2001/0029182 A1 | 10/2001 | McCann et al. |
| 2002/0013767 A1 | 1/2002 | Katz |
| 2002/0029274 A1 | 3/2002 | Allen |
| 2002/0053033 A1 | 5/2002 | Cooper et al. |
| 2002/0053082 A1 | 5/2002 | Weaver et al. |
| 2002/0058499 A1 | 5/2002 | Ortiz |
| 2002/0061009 A1* | 5/2002 | Sorensen ..................... 370/351 |
| 2002/0069278 A1 | 6/2002 | Forslöw |
| 2002/0071477 A1* | 6/2002 | Orava .......................... 375/132 |
| 2002/0075940 A1* | 6/2002 | Haartsen ...................... 375/132 |
| 2002/0102987 A1 | 8/2002 | Souisse et al. |
| 2002/0110110 A1 | 8/2002 | Tiihonen et al. |
| 2002/0120873 A1 | 8/2002 | Salmivalli |
| 2002/0122410 A1 | 9/2002 | Kulikov et al. |
| 2002/0141358 A1 | 10/2002 | Requena |
| 2002/0145978 A1 | 10/2002 | Batsell et al. |
| 2002/0173272 A1* | 11/2002 | Liang et al. ..................... 455/63 |
| 2003/0032433 A1 | 2/2003 | Daniel et al. |
| 2003/0037033 A1* | 2/2003 | Nyman et al. ..................... 707/1 |
| 2003/0053493 A1 | 4/2003 | Graham Mobley et al. |
| 2003/0068975 A1 | 4/2003 | Qiao et al. |
| 2003/0117978 A1 | 6/2003 | Haddad |
| 2003/0120594 A1 | 6/2003 | Shaginaw et al. |
| 2003/0137976 A1 | 7/2003 | Zhu et al. |
| 2003/0139180 A1 | 7/2003 | McIntosh et al. |
| 2003/0153338 A1 | 8/2003 | Herz et al. |
| 2003/0235174 A1 | 12/2003 | Pichna et al. |
| 2003/0235175 A1* | 12/2003 | Naghian et al. ............... 370/338 |
| 2004/0006621 A1 | 1/2004 | Bellinson et al. |
| 2004/0022224 A1* | 2/2004 | Billhartz ...................... 370/338 |
| 2004/0029553 A1 | 2/2004 | Cain |
| 2004/0064351 A1 | 4/2004 | Mikurak |
| 2004/0078323 A1 | 4/2004 | Johnston et al. |
| 2004/0100929 A1* | 5/2004 | Garcia-Luna-Aceves .... 370/338 |
| 2004/0128231 A1 | 7/2004 | Morita |
| 2004/0156312 A1 | 8/2004 | Salonidis et al. |
| 2004/0162871 A1 | 8/2004 | Pabla et al. |
| 2004/0165548 A1 | 8/2004 | Backes |
| 2004/0185777 A1 | 9/2004 | Bryson |
| 2004/0192204 A1 | 9/2004 | Periyalwar et al. |
| 2004/0203820 A1* | 10/2004 | Billhartz .................... 455/452.1 |
| 2004/0260808 A1 | 12/2004 | Strutt |
| 2004/0264466 A1* | 12/2004 | Huang .......................... 370/392 |
| 2005/0063419 A1* | 3/2005 | Schrader et al. .............. 370/466 |
| 2005/0080872 A1 | 4/2005 | Davis et al. |
| 2005/0111418 A1 | 5/2005 | Yang et al. |
| 2005/0153725 A1 | 7/2005 | Naghian et al. |
| 2005/0157661 A1 | 7/2005 | Cho |
| 2005/0169209 A1 | 8/2005 | Miu et al. |
| 2005/0169257 A1 | 8/2005 | Lahetkangas et al. |
| 2005/0193221 A1 | 9/2005 | Yoneyama |
| 2005/0203834 A1 | 9/2005 | Prieston |
| 2005/0213503 A1 | 9/2005 | Guo et al. |
| 2006/0002326 A1 | 1/2006 | Vesuna |
| 2006/0034330 A1 | 2/2006 | Iwamura |
| 2006/0085543 A1 | 4/2006 | Hrastar et al. |
| 2006/0095582 A1 | 5/2006 | Nitya et al. |
| 2006/0109787 A1* | 5/2006 | Strutt et al. ................... 370/235 |
| 2006/0114853 A1 | 6/2006 | Hasty et al. |
| 2006/0126504 A1 | 6/2006 | Meier et al. |
| 2006/0167784 A1 | 7/2006 | Hoffberg |
| 2006/0176829 A1 | 8/2006 | McLaughlin et al. |
| 2006/0179143 A1 | 8/2006 | Walker et al. |
| 2006/0187858 A1 | 8/2006 | Kenichi et al. |
| 2006/0193295 A1* | 8/2006 | White et al. .................. 370/336 |
| 2006/0205408 A1* | 9/2006 | Nakagawa et al. ........... 455/445 |
| 2006/0224502 A1 | 10/2006 | McGowan |
| 2006/0233377 A1* | 10/2006 | Chang et al. ................. 380/278 |
| 2006/0274214 A1* | 12/2006 | Carro ........................... 348/722 |
| 2006/0294258 A1* | 12/2006 | Powers-Boyle et al. ...... 709/246 |
| 2007/0005797 A1 | 1/2007 | Fontijn et al. |
| 2007/0019771 A1 | 1/2007 | Ambuehl et al. |
| 2007/0117537 A1 | 5/2007 | Hui et al. |
| 2007/0124204 A1 | 5/2007 | de Boer et al. |
| 2007/0140272 A1* | 6/2007 | Gulliksson ................... 370/401 |
| 2007/0206528 A1* | 9/2007 | Walton et al. ................. 370/328 |
| 2007/0258359 A1* | 11/2007 | Ogasawara et al. ........... 370/218 |
| 2007/0298764 A1* | 12/2007 | Clayton ........................ 455/407 |
| 2008/0008140 A1 | 1/2008 | Forssell |
| 2008/0040481 A1 | 2/2008 | Joshi et al. |
| 2008/0104202 A1 | 5/2008 | Barrett et al. |
| 2008/0167982 A1 | 7/2008 | Leo et al. |
| 2008/0204448 A1* | 8/2008 | Dawson et al. ............... 345/419 |
| 2008/0281529 A1* | 11/2008 | Tenenbaum et al. ........... 702/19 |
| 2008/0298283 A1* | 12/2008 | Dawson et al. ............... 370/310 |
| 2008/0298314 A1* | 12/2008 | Dawson et al. ............... 370/329 |
| 2008/0301017 A1* | 12/2008 | Dawson et al. ................. 705/35 |
| 2009/0323587 A1* | 12/2009 | Trachewsky et al. ......... 370/328 |
| 2010/0008221 A1* | 1/2010 | Hong et al. ................... 370/226 |
| 2010/0205116 A1 | 8/2010 | Erlanger |

FOREIGN PATENT DOCUMENTS

| | | |
|---|---|---|
| WO | 9915960 | 4/1999 |
| WO | 03037009 | 5/2003 |
| WO | 04001585 | 12/2003 |
| WO | 2006004628 | 1/2006 |

OTHER PUBLICATIONS

Non-final Office Action dated Nov. 25, 2009 in U.S. Appl. No. 11/755,802.

Non-final Office Action dated Oct. 19, 2009 in U.S. Appl. No. 11/755,788.

Qui et al.. "Bandwidth in Ad Hoc Networks: A Price-Based Approach," 2003, IEEE, pp. 1-10.

Notice of Allowance dated Aug. 25, 2010 in U.S. Appl. No. 11/755,780.

Office Action dated Sep. 14, 2010 in U.S. Appl. No. 11/755,788.

Final Office Action dated Sep. 15, 2010 in U.S. Appl. No. 11/755,782.
Notice of Allowance dated Oct. 12, 2010 in U.S. Appl. No. 11/755,808.
Office Action dated Oct. 29, 2010 in U.S. Appl. No. 11/755,786.
IEEE 802.22, Wireless RANs, 220 pages, Mar. 2006.
Michelini et al, Spectral Sharing Across 2G-3G Systems, IEEE, 5 pages, 2003.
Das et al, A Structured Channel Borrowing Scheme for Dynamic Load Balancing in Cellular Networks, IEEE, 8 pages, 1997.
Non-final Office Action dated Dec. 24, 2009 in U.S. Appl. No. 11/755,776.
Non-final Office Action dated Jan. 22, 2010 in U.S. Appl. No. 11/755,778.
Non-final Office Action dated Jan. 21, 2010 in U.S. Appl. No. 11/755,808.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Non-Final Office Action dated Mar. 4, 2010 in U.S. Appl. No. 11/755,775.
Final Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-Final Office Action dated Jan. 25, 2010 in U.S. Appl. No. 11/755,771.
Office Action dated Jun. 4, 2010 in U.S. Appl. No. 11/755,780.
Office Action dated Jun. 22, 2010 in U.S. Appl. No. 11/755,776.
Office Action dated Jul. 12, 2010 in U.S. Appl. No. 11/755,808.
Notice of Allowance dated Jun. 9, 2010 in U.S. Appl. No. 11/755,802.
Notice of Allowance dated Jun. 28, 2010 in U.S. Appl. No. 11/755,771.
Notice of Allowance dated Jul. 13, 2010 in U.S. Appl. No. 11/755,778.
Notice of Allowance dated Aug. 16, 2010 in U.S. Appl. No. 11/755,763.
Non-final Office Action dated Dec. 23, 2008 in U.S. Appl. No. 11/755,806.
Final Office Action dated Jun. 3, 2009 in U.S. Appl. No. 11/755,806.
Final Office Action dated Jun. 9, 2009 in U.S. Appl. No. 11/755,806.
Final Office Action dated Nov. 26, 2010 in U.S. Appl. No. 11/755,775.
Notice of Allowance dated Dec. 14, 2010 in U.S. Appl. No. 11/755,776.
Notice of Allowance dated Feb. 14, 2011 in U.S. Appl. No. 11/755,788.
Office Action dated Mar. 3, 2011 in U.S. Appl. No. 11/755,800.
Final Office Action dated Mar. 25, 2011 in U.S. Appl. No. 11/755,786.
Office Action dated Jul. 21, 2011 in U.S. Appl. No. 11/755,775.
Notice of Allowance dated Jun. 10, 2011 in U.S. Appl. No. 11/755,786.
Office Action dated Aug. 18, 2011 in U.S. Appl. No. 11/755,800.
Office Action dated Jan. 9, 2012 in U.S. Appl. No. 11/755,775.
Office Action dated Oct. 20, 2011 in U.S. Appl. No. 11/755,811.
D. Zhu et al., "QoS Aware Wireless Bandwidth Aggregation (QAWBA) by Integrating Cellular and Ad-hoc Networks.", 2004.
D. Zhu et al., "Using Cooperative Multiple Paths to Reduce File Download Latency in Cellular Data Networks.", Dec. 2005.
Final Office Action dated Jan. 26, 2012 in U.S. Appl. No. 11/755,800.
BPAI Decision dated Mar. 14, 2012 in U.S. Appl. No. 11/755,806.
Notice of Allowance dated Apr. 13, 2012 in U.S. Appl. No. 11/755,806.
Final Office Action dated Apr. 12, 2012 in U.S. Appl. No. 11/755,811.
Final Office Action dated Jul. 13, 2012 in U.S. Appl. No. 11/755,775, 16 pages.
Examiner's Answer dated Aug. 15, 2012 in U.S. Appl. No. 11/755,800, 17 pages.
Office Action dated Jul. 19, 2012 in U.S. Appl. No. 11/755,811, 22 pages.
"ad hoc", http://www.thefreedictionary.com/Ad-hoc, Jul. 3, 2012, pp. 1-2.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

Figure 4

FORMATION AND REARRANGEMENT OF LENDER DEVICES THAT PERFORM MULTIPLEXING FUNCTIONS

CROSS-REFERENCE TO RELATED APPLICATIONS

This application is related to the following applications, all of which are incorporated herein by reference in their entireties: application Ser. No. 11/755,808, published as U.S. Pub. No. 2008/0301017; application Ser. No. 11/755,780, published as U.S. Pub. No. 2008/0298327, application Ser. No. 11/755,775, published as U.S. Pub. No. 2008/0301017, and application Ser. No. 11/755,806, published as U.S. Pub. No. 2008/0301039.

FIELD OF THE INVENTION

The invention generally relates to systems and methods for sharing bandwidth in ad hoc networks, and more particularly to systems and methods for the formation and rearrangement of lender devices that perform multiplexing functions within bandwidth-sharing ad hoc networks.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises establishing an ad-hoc network between a borrower and at least two lenders of bandwidth and establishing one lender of the at least two lenders as a multiplexer to manage data flow over the ad-hoc network between the borrower and lenders of the at least two lenders of bandwidth.

In another aspect of the invention, the method comprises establishing an ad-hoc network between a borrower and at least two lenders of bandwidth by broadcasting a table to the at least two lenders. The method further comprises requesting one of the at least two lenders to be a multiplexer to manage data flow over the ad-hoc network based on required criteria, and establishing the one of the at least two lenders as the multiplexer based on information provided by the at least two lenders which meets the required criteria.

In another aspect of the invention, a method for providing a formation of a multiplexed ad-hoc network comprises providing a computer infrastructure. The computer infrastructure being operable to: establish an ad-hoc network between a borrower and at least two lenders of bandwidth by broadcasting a table to the at least two lenders; request one of the at least two lenders to be a multiplexer to manage data flow over the ad-hoc network; and establish the one of the at least two lenders as the multiplexer based on required criteria provided by the borrower.

In another aspect of the invention, a system comprises a server having a database containing data associated with one or more lenders and a borrower in an ad-hoc network. At least one of a hardware and software component establishes an ad-hoc network between a borrower and at least two lenders of bandwidth by broadcasting a table to the at least two lenders; requests one of the at least two lenders to be a multiplexer to manage data flow over the ad-hoc network based on required criteria; and establishes the one of the at least two lenders as the multiplexer based on information provided by the at least two lenders which meets the required criteria.

In yet another aspect of the invention, a computer program product comprises a computer usable medium having readable program code embodied in the medium. The computer program product includes at least one component to: establish an ad-hoc network between a borrower and at least two lenders of bandwidth; and establish one lender of the at least two lenders as a multiplexer to manage data flow over the ad-hoc network between the borrower and lenders of the at least two lenders of bandwidth.

BRIEF DESCRIPTION OF THE DRAWINGS

FIG. 4 shows an example table created and used in implementing aspects of the invention;

DETAILED DESCRIPTION OF EMBODIMENTS OF THE INVENTION

The invention generally relates to systems and methods for the formation and rearrangement of lender devices that perform multiplexing functions. More particularly, the present invention is directed to systems and methods for the formation of lender devices that perform multiplexing functions in a bandwidth-sharing ad hoc network. More particularly, the present invention is directed to systems and methods for the rearrangement of lender devices that perform multiplexing functions in a bandwidth-sharing ad hoc network should a lender device performing multiplexing functions become unavailable.

By implementing the methods and systems of the invention, e.g., the formation and rearrangement of lender devices that perform multiplexing functions, multiple disparate wireless connections in conjunction with multiple devices using a variety of service providers, for example, can be used to create a single virtual fat pipe for transmission of data over a network. The individuals who share their current connections, i.e., bandwidth, acting as gateway devices, are 'lenders' of bandwidth; whereas, the individuals who require additional bandwidth are 'borrowers'. By implementing the systems and methods of the invention, borrowers and/or multiplexers are able to form and rearrange lender devices to perform multiplexing functions in a bandwidth-sharing ad hoc network.

System Environment

Figure 1:
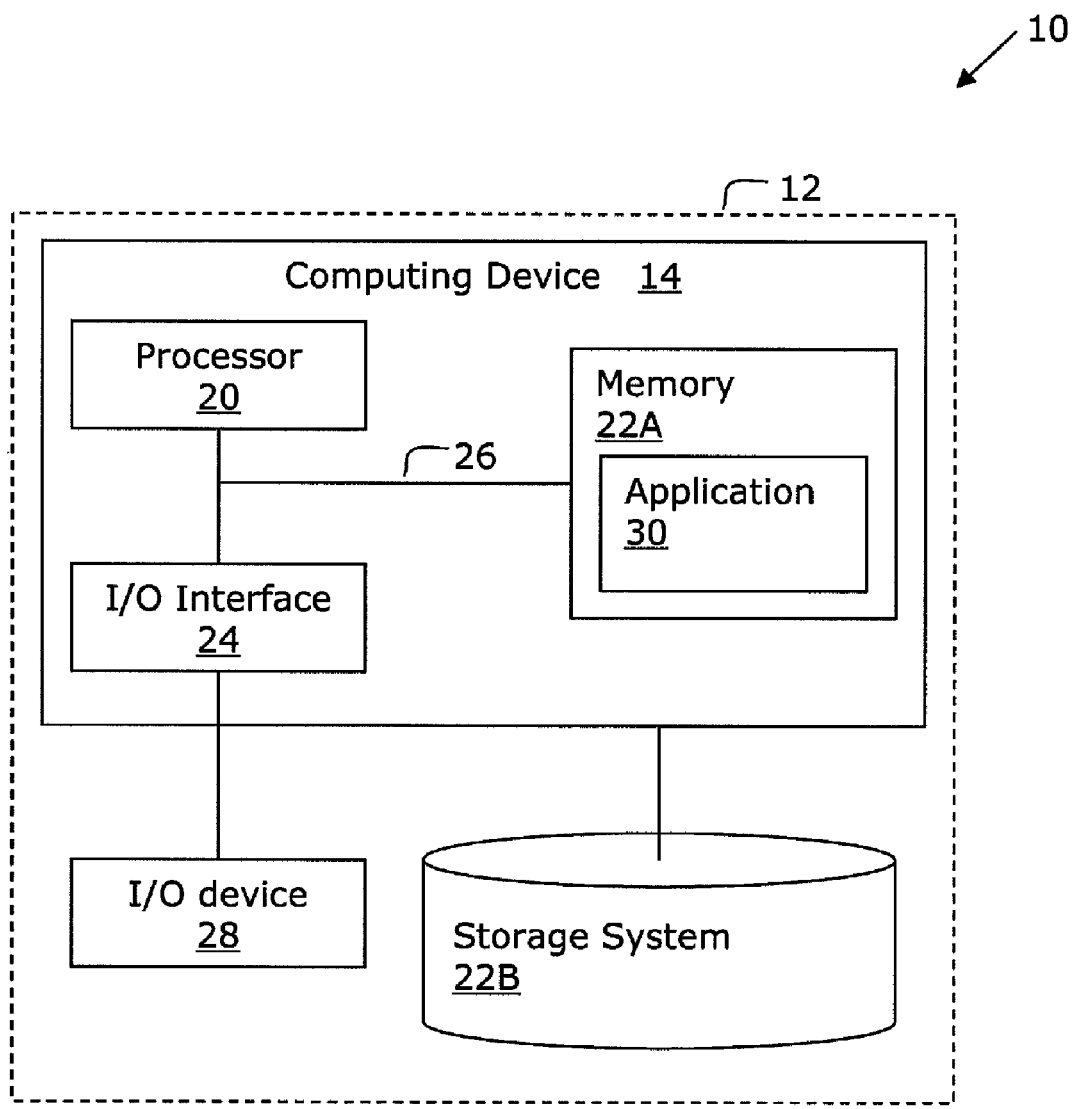
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to form and rearrange lender devices into multiplexing devices in ad hoc networks in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Ad Hoc Networks

"Ad hoc" relationships are becoming increasingly important in the communal sharing of immediately available resources, and most particularly, the sharing of bandwidth. With the creation of peer-to-peer networks and bit torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example is a 802.11g local area connection that creates a high-speed wireless connection between two cellular phone devices within close range (high bandwidth), and wherein the cellular phones' cellular connection to the outside world may provide bandwidth at less than one percent of the 802.11g connection.

In embodiments of the invention, a lender performs multiplexing functions within a bandwidth-sharing ad hoc network formed between a borrower and one or more lenders. In embodiments, a lender may reactively promote themselves as a multiplexing device, proactively or in response to a request by a borrower. In further embodiments, the borrower or multiplexer may rearrange the bandwidth-sharing ad hoc network when the multiplexer lender is no longer available or can no longer provide the originally requested functions.

In order to utilize the formation and rearrangement schemes of lender devices that perform multiplexing functions in bandwidth-sharing networks, an ad hoc network may be created between a borrower node and one or more lender nodes. This process may include both an initial discovery mechanism of the proposed role each node may play, and a negotiation and acceptance of the agreed compensation scheme.

Figure 2A:
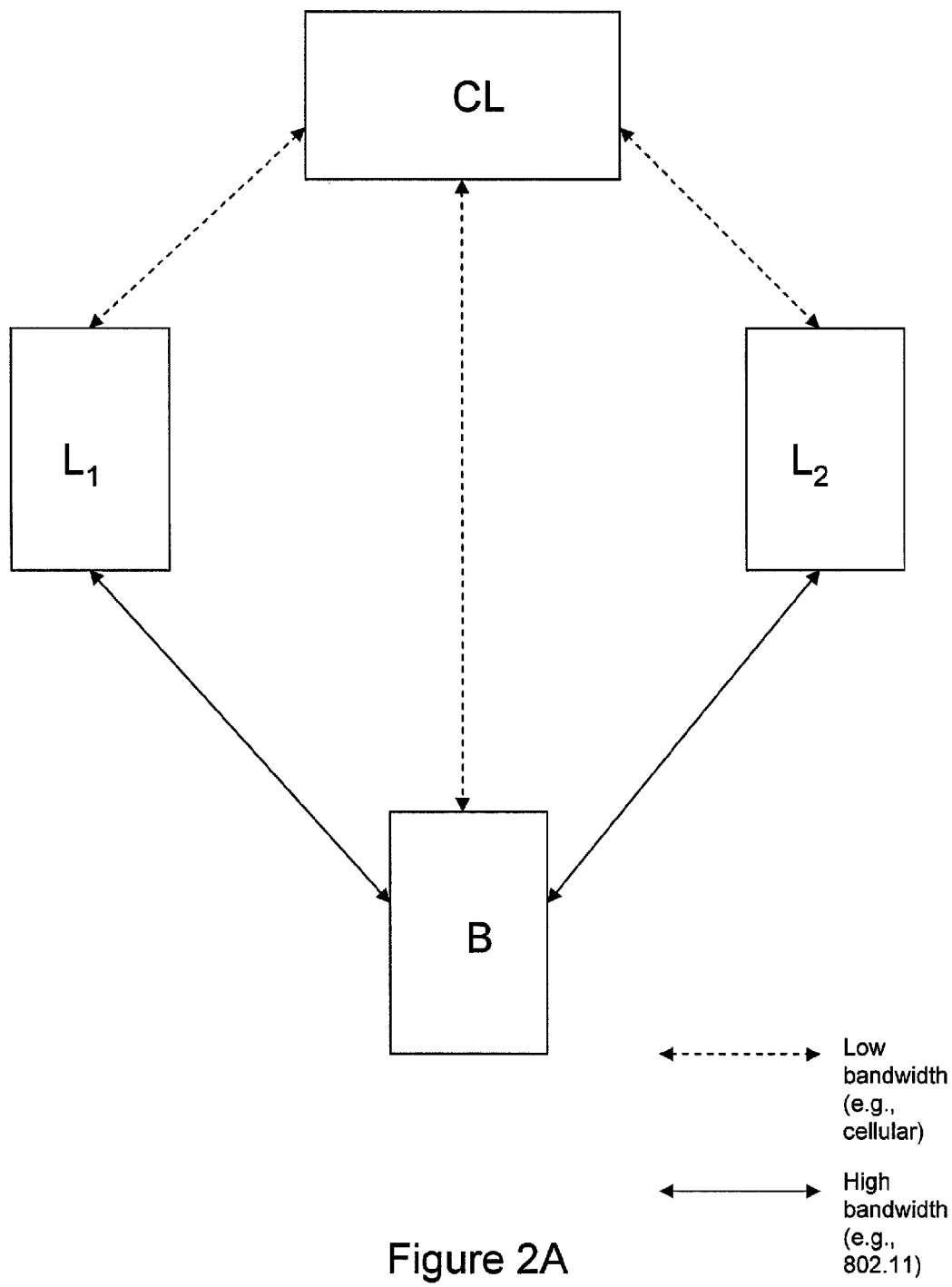
FIG. 2A is an overview of a peer-to-peer ad hoc network.

FIG. 2A is a general overview of a non-multiplexed, peer-to-peer (P2P) bandwidth sharing architecture which may be implemented with the systems and methods of the invention. An illustrative non-multiplexed, peer-to-peer (P2P) bandwidth sharing architecture is set forth in application Ser. No. 11/755,808.

In this implementation, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
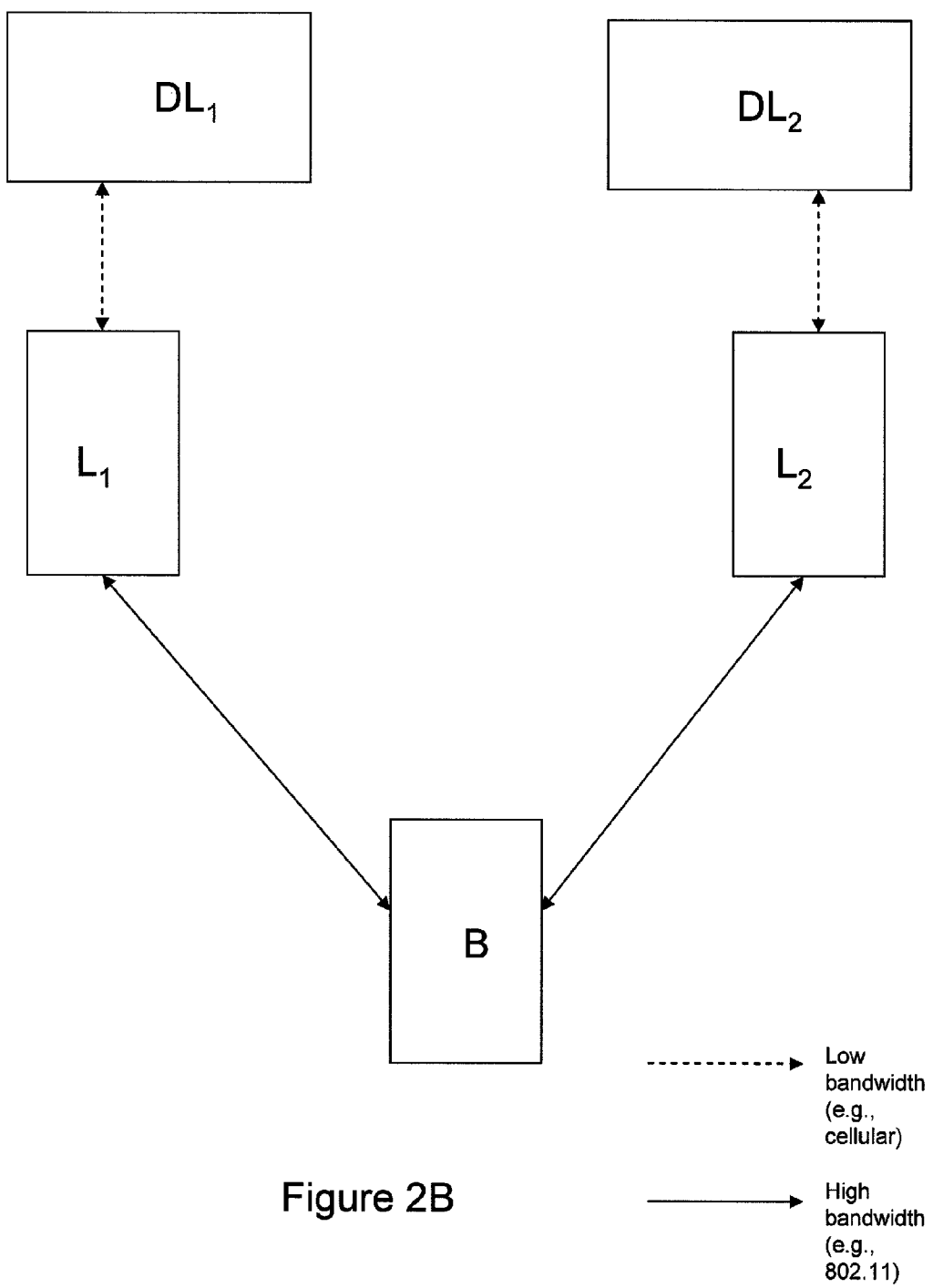
FIG. 2B is an overview of an alternative peer-to-peer ad hoc network.

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 3:
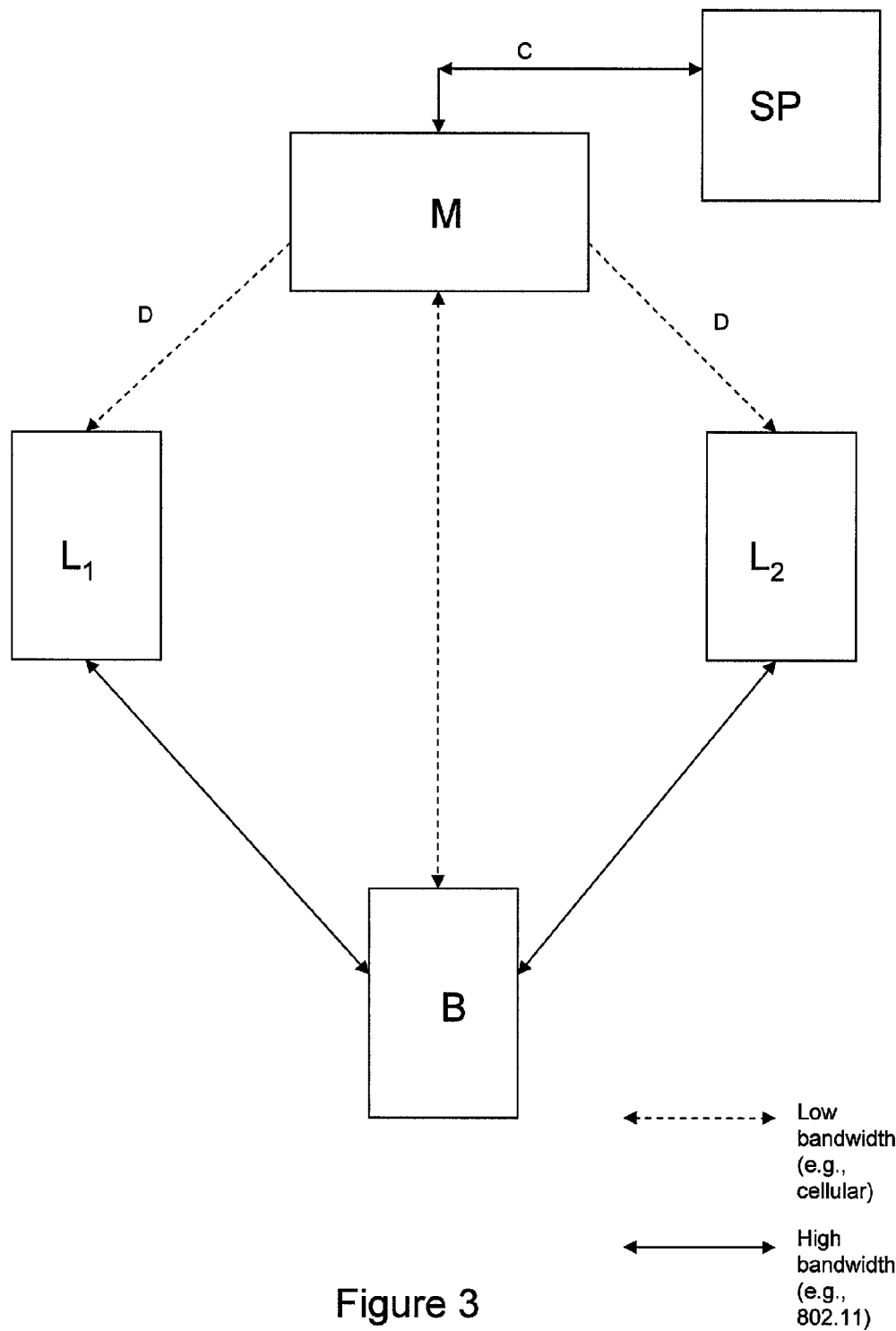
FIG. 3 is an overview of an ad hoc network implementing services of a multiplexer.

FIG. 3 is a general overview of a multiplexed gateway bandwidth sharing architecture which may be implemented with the invention. An illustrative multiplexed, gateway bandwidth-sharing architecture is set forth in application Ser. No. 11/755,780. In this implementation, a borrower B will request a multiplexer M to set up an ad-hoc network. The multiplexer M may communicate with a service provider SP and connect to one or more lenders, L1 and L2, via a wireless network. In this implementation, the borrower may initially broadcast a message for lenders and, upon receipt of a response, transmit the lender locations and other criteria to the multiplexer. Once a network is established, the multiplexer will manage the network, including the bandwidth allocations provided by each of the lenders, for example.

Initial Formation of the Ad Hoc Network

In order to form a new ad hoc network, a borrower may scan all available potential lenders and prioritize the potential lenders for a data transfer. An illustrative formation and rearrangement of ad hoc network bandwidth-sharing architecture is set forth in application Ser. No. 11/755,775.

By way of illustration and shown in application Ser. No. 11/755,775, the formation of the ad hoc network, in embodiments, may use a "borrower/lender" table as shown in FIG. 4. In this example, the borrower or multiplexer will broadcast the table to potential lenders which, in turn, will return the table, with information pertinent to the lender, to the borrower or the multiplexer. Using this information, the borrower or multiplexer can establish an ad hoc network with lenders that meet certain criteria, e.g., reliability, speed, availability and/or costs.

In the borrower/lender table of FIG. 4, the "Node Name" column may be the unique identifier of a node such as the borrower and lenders. For example, this could be a hostname, a Bluetooth® name (Bluetooth are trademarks of Bluetooth Sig, Inc. in the United States, other countries, or both) name or any other information that can uniquely describe the node. The "Node Type" column may describe whether this node is a borrower, a lender, or a multiplexer. The "Location" column may be an IP address, Wi-Fi address, Bluetooth® address, MAC address or any other attribute that can be used to locate the node. The "File Requested for Transfer" column may be used to store information about the file (or piece of file) to be transferred. This may be an HTTP address, an FTP address or other information to describe where and how the data is to be found.

The "Price" column may be a price set by the lender to use the lender's bandwidth. The price may be stated in price/MB, number of minutes to be used in a wireless service plan or any other charging mechanism. The "Service Level Objective" column may describe the negotiated service levels of the node. For example, the requested bandwidth, the availability of the node, reliability and so forth. Additionally, the "Service Level Objective", may contain reliability information, such as the ability to provide a bandwidth amount for a period of time, or a bandwidth amount within a range of bandwidth (i.e., between 1 kb/second and 2 kb/second). The "Current Quality of Service" column may contain the current quality of service (QoS) of the node. The QoS information may contain a status of the node, e.g., how well the service levels are being met, the current transfer rate, or the current progress of the file download.

In aspects of the invention, a borrower and a lender may not see all of the table on their respective devices, and some of the table information may be generated automatically. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

A borrower may, for example, initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. The lender may also designate itself as a potential multiplexer as discussed below in more detail.

Multiplexer Attributes

In order for a lender to become a multiplexer, a borrower may request that a lender/potential multiplexer have certain characteristics. A borrower may request that a potential multiplexer have a fast connection to the data required by the borrower. This could be a connection to the Internet or other wide area network, as shown in FIG. 3 as path C. Furthermore, a borrower may require that a potential multiplexer, in an ideal case, have a higher (or close to higher) bandwidth, i.e., a faster connection, to the Internet, or other network, than the aggregated bandwidth of all the other lenders combined. If a potential multiplexer does not have a higher (or close to higher) bandwidth connection to the Internet, or other network, than the aggregate bandwidth connection of all the lenders in the bandwidth sharing ad hoc network, then the borrower may not want to use the potential multiplexer, as the download speed may be slower than in a non-multiplexer, peer-to-peer environment.

A borrower may request that the multiplexer have the ability to directly connect to the other lenders in the ad hoc network, as shown in FIG. 3 as path D, at a reasonable speed. A reasonable speed may be, in an ideal case, a higher (or close to higher) bandwidth, i.e., a faster connection, to the other lenders in the ad hoc network, than the other lenders aggregated bandwidth connection to the Internet, or other network. This may be necessary because, again, all traffic will flow via the multiplexer and, if the speed of the multiplexer is not equal to or greater than the aggregate speed of the lenders, for example, the multiplexer may become a bottleneck. If a potential multiplexer does not have a higher (or close to higher) bandwidth connection to the other lenders in the ad hoc network, than the other lenders' aggregate bandwidth connection to the Internet, or other network, then the borrower may not desire to use the potential multiplexer, as the download speed may be slower than in a non-multiplexer, peer-to-peer environment. Additionally, the borrower may require the multiplexer be able to communicate with the borrower and all the lenders within the ad hoc network.

The multiplexer should also be an intelligent device capable of multiplexing functions. The multiplexing functions may include, for example, managing the state table, breaking up the data stream into multiple data "chunks" that can be sent to and received by lenders in the ad hoc network.

An example of an arrangement that may meet these multiplexer attributes are a lender device that is a PC or Laptop connected to a high speed Wi-Fi network to the Internet, or other network, and has the ability to broadcast out to the ad hoc local wireless network. Another example may be a cellular device that has an EDGE or 3G fast connection and a local broadcast protocol such as Bluetooth®.

While multiplexer attributes were described above as ideal when the bandwidth of the multiplexer both to the network, and to the lenders in the ad hoc network was higher (or at least close to higher) than the aggregate bandwidth of the other lenders, it should be understood that a multiplexer may still be desirable to a borrower when the multiplexer's bandwidth to either the network, or to the lenders in the ad hoc network, is equal to or lower than the aggregate bandwidth connections of the lenders to the network. For example, a multiplexer may be slower, but based on other factors, e.g., price, service quality objectives, reliability, guaranteed time within the ad hoc network, may still meet the borrower's bandwidth sharing needs. The reasons as to why the lender may want to be "promoted" to a multiplexer may include an ability to charge a higher price than the price charged to be only a lender, for example.

Flow Diagrams

The steps of the flow diagrams described herein may be implemented in the environment of FIG. 1 to provide formation and rearrangement instructions for forming and rearranging lender devices that perform multiplexing functions within bandwidth-sharing ad hoc networks. In each of the embodiments, described below, a bandwidth sharing agreement may be reached on data, quality of service (QoS) and associated costs between borrowers, lenders and/or multiplexers.

The flow diagrams may equally represent high-level block diagram of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Promoting a Lender to a Multiplexer: Reactive Lender

Figure 5:
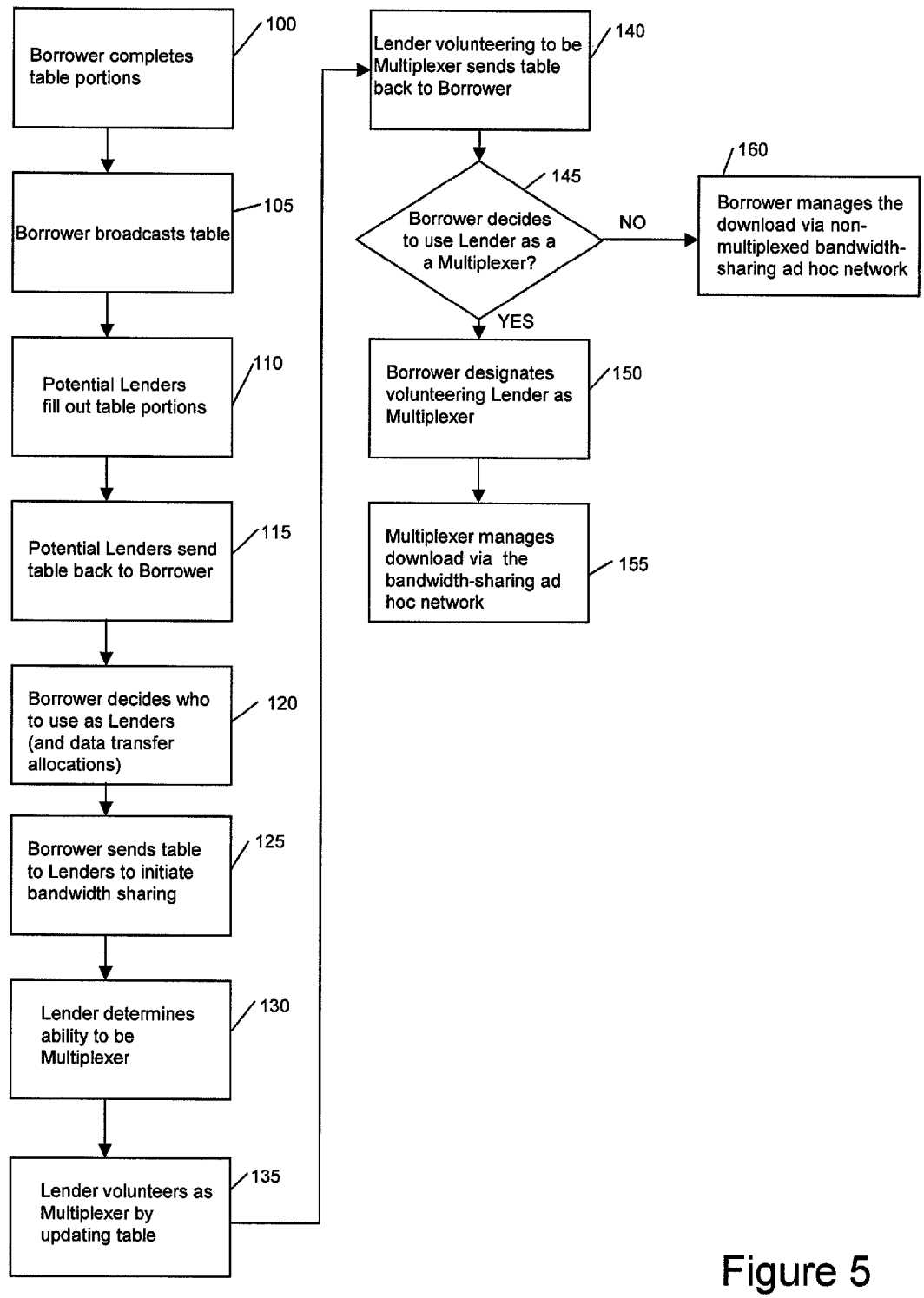
FIG. 5 is a flow chart of steps for implementing aspects of the invention.

FIG. 5 shows a flow chart for forming and rearranging lender devices to perform multiplexing functions in a bandwidth-sharing ad hoc network. In this embodiment, a lender device reacts to a request or broadcast from borrower. As a preliminary matter, when forming the ad hoc network, a borrower may initiate or substantiate the borrower/lender table of FIG. 4. For example, a node "Borrower 1" may initially create the table of FIG. 4 in order to create an ad hoc network to transfer a large piece of data from the Internet. The lender may then complete its portion of the table, and send it back to the borrower for tabulation and formation of the network.

As shown in the flow chart of FIG. 5, at step 100, the borrower may complete one line of a new table to describe its node. At this step, the node name, type, location and file requested columns may be completed. For example, as shown in TABLE 1, Borrower 1 would complete the table showing current location on a Wi-Fi Network called 'Airport', with IP address 192.168.2.3, to download a file from http://location.com/myfile. At this point, the other columns may remain blank.

TABLE 1

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |

At step 105, the borrower may broadcast a request to form an ad hoc network. This broadcast, in embodiments, includes the table for completion by any available nodes within range that could be used to form the ad hoc network. The table may be broadcast over the wireless network using a plurality of different protocols such as Bluetooth®, Wi-Fi or Cellular. The table can be represented in binary, xml, text or other data format optimized for the type of data transport.

A node receives the broadcast, including the table, and at step 110, a potential lender may complete necessary information in the table. For example, as shown in TABLE 2, below, Lender 1 is a node on the same Wi-Fi network 'Airport' and is able to perform lender functions for $5/MB at a rate of 10 kb/second. The "File Requested for Transfer" column may remain blank, because the borrower has not yet decided which of the potential lenders will be part of the bandwidth-sharing ad hoc network. Additionally, the "Current Quality of Service" column may remain blank, because no bandwidth sharing has occurred yet.

TABLE 2

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 10 kb/sec | NA |

Lender 1, at step 115, may send back this information to Borrower 1. The processes, at steps 110 and 115, may be repeated for other potential lenders of bandwidth in the ad hoc network. In this manner, the table may gradually be built up such that the borrower can select lenders to use.

For example, as shown below in TABLE 3, additional nodes, Lender 2 and Lender 3, provided the information for each lender, and this information has been tabulated by the borrower, upon receipt. In this example, Lender 2 is on a Bluetooth Network and can download the file requested for transfer at a price of $10/MB and a rate of 2 kb/second. Additionally, Lender 3, is on some other protocol, and can download the file requested for transfer at a price of $10/MB and a rate of 5 kb/second.

TABLE 3

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |

TABLE 3-continued

| Node Name | Node Type | Location | File Requested for Transfer | Price | Service Level Objective | Current Quality of Service |
|---|---|---|---|---|---|---|
| Lender 1 | Lender | Wi-Fi network 'AIRPORT' IP Address: 192.168.2.10 | NA | $5/MB | Can download at 10 kb/sec | NA |
| Lender 2 | Lender | Bluetooth name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

At step 120, the borrower may browse through the table to determine which lenders should be part of the bandwidth-sharing ad hoc network. By way of example, using a combination of "Service Level Objectives" and "Price", Borrower 1 may decide how many lenders to use and at what cost. The borrower may then select the best number of lenders and file chunks such that the price remains low and the speed is reasonably fast, as one example.

At step 125, for example, the Borrower 1 may then transmit the table to Lender 1, Lender 2 and Lender 3 with the following information of TABLE 4.

TABLE 4

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | http://location.com/myfile first 33% | $5/MB | Can download at 10 kb/sec | NA |
| Lender 2 | Lender | Bluetooth name 'Motorola' Pairing key: 1234 | http://location.com/myfile middle 33% | $10/MB | Can download at 2 kb/sec | NA |
| Lender 3 | Lender | Other Protocol 'XXX' Name: 19283 | http://location.com/myfile last 33% | $10/MB | Can download at 5 kb/sec | NA |

In this example, Borrower 1 is requesting that Lender 1 transfer the first ⅓ of the file requested for download, 'myfile', and requesting that Lender 2 transfer the second ⅓ of the file, 'myfile', and requesting that Lender 3 transfer the last ⅓ of the file, 'myfile'.

In the above example, there are three lenders, Lender 1, Lender 2, and Lender 3 and one borrower, Borrower 1, as indicated in the borrower/lender state table. In the situation where Lender 1 would like to become a multiplexer, at step 130, Lender 1 may look through the state table to determine whether it has the desired attributes of a multiplexer. This may include a faster (or very close to faster) connection speed to the network than the other lenders combined connection speed to the network, in an ideal case. Additionally, Lender 1 should be an intelligent device capable of multiplexing functions. However, as Lender 1 knows its device capabilities, Lender 1 would not need the information in the state table to make the intelligent device determination.

Assuming that the lender meets certain criteria, at step 135, the lender may update the state table information to request that the lender become a multiplexer. In the above example, Lender 1 may update the table with the following information of TABLE 5.

TABLE 5

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Multipexer? | Wi-Fi network 'AIRPORT' IP Address: 192.168.2.10 | http://location.com/myfile first 33% | $5/MB - Lender $10/MB - Multiplexer | Can download at 10 kb/sec | NA |
| Lender 2 | Lender | Bluetooth name Pairing key: 1234 | http://location.com/myfile middle 33% | $10/MB | Can download at 2 kb/sec | NA |
| Lender 3 | Lender | Other Protocol 'XXX' Name: 19283 | http://location.com/myfile last 33% | $10/MB | Can download at 5 kb/sec | NA |

As shown in TABLE 5, Lender 1 has changed their "Node Type" column information from "Lender" to "Multiplexer?". Additionally, as shown in TABLE 5, Lender 1 may indicate more than one pricing scheme, e.g., a price for being a lender and a price for being a multiplexer. At step 140, the lender, in this example Lender 1, may send the updated table back to the borrower.

At step 145, the borrower, in this example Borrower 1, may elect to use the lender, Lender 1, as a multiplexer. If the borrower decides to use Lender 1 as a multiplexer, at step 150, the borrower may designate Lender 1 as a multiplexer. In the above example, Lender 1 may update the table with the following information of TABLE 6.

At step 155, the multiplexer manages the download via the bandwidth-sharing ad hoc network. An illustrative multiplexed, gateway bandwidth-sharing architecture is set forth in application Ser. No. 11/755,380. An illustrative formation and rearrangement of ad hoc network bandwidth-sharing architecture is set forth in application Ser. No. 11/755,775.

Alternatively, at step 145, the borrower may decide to not use the potential multiplexer as a multiplexer, but rather only use the potential multiplexer as a lender. At step 160, the borrower may manage the download via a non-multiplexed bandwidth-sharing ad hoc network. An illustrative non-multiplexed, bandwidth-sharing architecture is set forth in application Ser. No. 11/755,808.

TABLE 6

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Multiplexer | Wi-Fi network 'AIRPORT' IP Address: 192.168.2.10 | | $5/MB | Can download at 10 kb/sec | NA |
| Lender 2 | Lender | Bluetooth name Pairing key: 1234 | | $10/MB | Can download at 2 kb/sec | NA |
| Lender 3 | Lender | Other Protocol 'XXX' Name: 19283 | | $10/MB | Can download at 5 kb/sec | NA |

As shown in TABLE 6, Borrower 1 has changed Lender 1's "Node Type" column information from "Multiplexer?" to "Multiplexer". Additionally, as shown in TABLE 6, the "File Requested for Transfer" column may be cleared, as the multiplexer is now responsible for allocating the file portions amongst the lenders in the bandwidth-sharing ad hoc network.

Promoting a Lender to a Multiplexer: Proactive Lender

In another embodiment, it may not be necessary for a lender, interested in becoming a multiplexer, to wait until the state table is completed by the potential lenders in the ad hoc network before indicating a desire to be a multiplexer. Rather, a lender may indicate an interest in acting as a multiplexer earlier, i.e. be a proactive lender. This may allow the borrower to make the determination that the potential multiplexer is suitable to be a multiplexer in a quicker manner.

Figure 6:
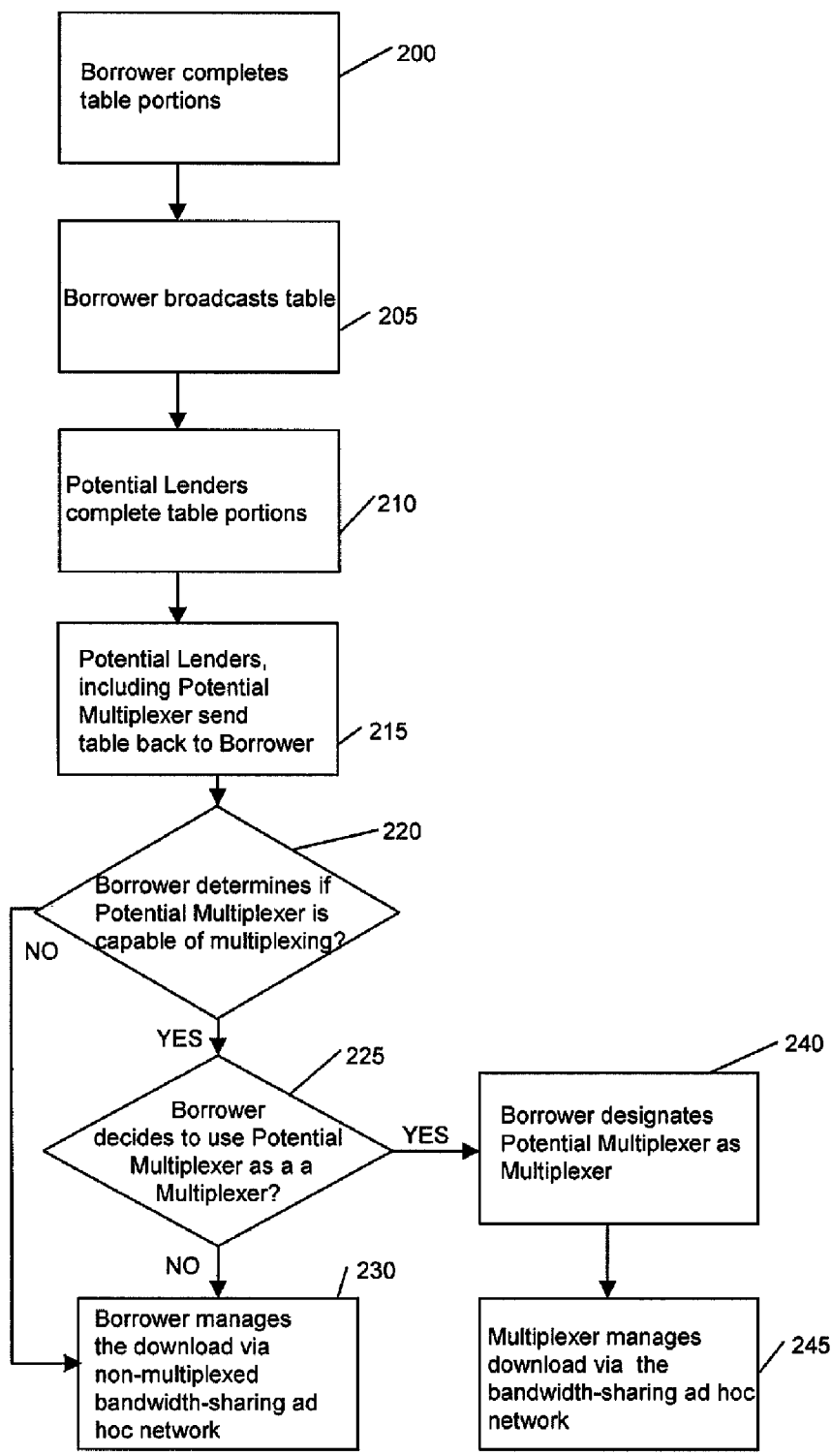
FIG. 6 is a flow chart of steps for implementing aspects of the invention.

As shown in the flow chart of FIG. 6, at step 200, a borrower may complete one line of a new table to describe their node. At step 205, the borrower may broadcast a request to form an ad hoc network. A node receives the broadcast, including the table, and at step 210, a potential lender may complete necessary information in the table. At this step, the potential lender may additionally, proactively, indicate a willingness to be a multiplexer. Using the above example, Lender 1 may complete the table with the following information of TABLE 7.

TABLE 7

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Multiplexer? | Wi-Fi network 'AIRPORT' IP Address: 192.168.2.10 | NA | $5/MB - Lender $10/MB - Multiplexer | Can download at 10 kb/sec | NA |

As shown in TABLE 7, Lender 1 has entered their "Node Type" column information as "Multiplexer?". At step 215, the lender, in this example Lender 1, may send the updated table back to the borrower. As Lender 1 may not yet know who else is available to share bandwidth in the ad hoc network, Lender 1 may not be able to make a determination of whether his bandwidth, or connection speeds, to both the network and other lenders in the ad hoc network is sufficient to satisfy the borrower's needs. However, Lender 1 may indicate a desire and willingness to act as a multiplexer pending the approval of Borrower 1. Additionally, as shown in TABLE 7, Lender 1 may indicate more than one pricing scheme, e.g., a price for being a lender and a price for being a multiplexer.

The processes, at steps 210 and 215, may be repeated for other potential lenders of bandwidth in the ad hoc network. In this manner, the table may gradually be built up such that borrower can select lenders to use. For example, as shown below in TABLE 8, additional nodes, Lender 2 and Lender 3, provide the information for each lender, and this information has been tabulated by the borrower, upon receipt.

TABLE 8

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Multiplexer? | Wi-Fi network 'AIRPORT' IP Address: 192.168.2.10 | NA | $5/MB - Lender $10/MB - Multiplexer | Can download at 10 kb/sec | NA |
| Lender 2 | Lender | Bluetooth name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

At step 220, the borrower may browse through the table to determine whether the potential multiplexer meets the needs of the borrower with regards to the multiplexer attributes. If the borrower determines that the potential multiplexer is capable of multiplexing (i.e., has the requested multiplexer attributes), at step 225, the borrower may decide to use a lender as a multiplexer.

At step 240, for example, the Borrower 1 may send an updated table to Lender 1, Lender 2 and Lender 3 with the following information of TABLE 9.

plexed, gateway bandwidth-sharing architecture is set forth in application Ser. No. 11/755,780. An illustrative formation and rearrangement of ad hoc network bandwidth-sharing architecture is set forth in application Ser. No. 11/755,775.

Alternatively, at step 220, the borrower may determine that the potential multiplexer does not meet the borrower's requirements for a multiplexer. Additionally, at step 225, the borrower may decide to not use the potential multiplexer as a

TABLE 9

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Multiplexer | Wi-Fi network 'AIRPORT' IP Address: 192.168.2.10 | NA | $10/MB | Can download at 10 kb/sec | NA |
| Lender 2 | Lender | Bluetooth name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

As shown in TABLE 9, Borrower 1 has changed Lender 1's "Node Type" column information from "Multiplexer?" to "Multiplexer", thereby indicating that Lender 1 will act as a multiplexer.

At step 245, the multiplexer may manage the download via the bandwidth-sharing ad hoc network. This step may include the multiplexer initiating the download by sending an updated table to Lender 2, Lender 3 and Borrower 1, indicating the file portions for each lender to download. An illustrative multimultiplexer, but rather only use the potential multiplexer as a lender, even though the potential multiplexer may meet the borrower's needs. In either case, at step 230, the borrower may manage the download via a non-multiplexed bandwidth-sharing ad hoc network. This may include, at step 230, the borrower sending a table to lenders to initiate bandwidth sharing with the following information of TABLE 10.

TABLE 10

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | http://location.com/myfile first 33% | $5/MB | Can download at 10 kb/sec | NA |
| Lender 2 | Lender | Bluetooth name Pairing key: 1234 | http://location.com/myfile middle 33% | $10/MB | Can download at 2 kb/sec | NA |
| Lender 3 | Lender | Other Protocol 'XXX' Name: 19283 | http://location.com/myfile last 33% | $10/MB | Can download at 5 kb/sec | NA |

An illustrative non-multiplexed, bandwidth-sharing architecture is set forth in application Ser. No. 11/755,808.

Rearrangement of the Ad Hoc Network when a Multiplexer Becomes Unavailable

Situations may arise in a multiplexed bandwidth-sharing ad hoc network, when a multiplexer may no longer be able, or willing, to serve as the multiplexer. This situation may arise when the multiplexer goes out of range of the ad hoc network, loses bandwidth available to share (i.e., requires more bandwidth for itself), or otherwise becomes unavailable. In these or other scenarios, the borrower that is in communication with the multiplexer, through the ongoing download of data, may discover that the multiplexer is unavailable. Each of the lenders that are leveraging the multiplexer may also report problems that the data they are requesting is no longer available. In these or other scenarios, the borrow may elect to wait for a period of time to determine whether the multiplexer becomes available again; or begin immediately to determine whether any other lenders are able to promote themselves to a multiplexer.

Additionally, the borrower may elect to revert to a non-multiplexed, peer-to-peer bandwidth-sharing arrangement. As an ad hoc network is dynamic, new potential lenders willing to share bandwidth may have entered the ad hoc network. A situation may arise where, when initially forming the bandwidth-sharing ad hoc network, the best option for the borrower (based on, e.g., price, bandwidth or service quality objectives) may have been to utilize a multiplexed arrangement. However, at a later time, when the borrower may be forced to rearrange the bandwidth-sharing ad hoc network, due to an unavailable multiplexer, the better option (based on, e.g., price, bandwidth, or service quality objectives) is to use more lenders, different lenders, or the remaining lenders in a non-multiplexed environment.

Furthermore, it should be recognized that a borrower could opt to rearrange the bandwidth-sharing ad hoc network proactively, rather than reactively. For example, a borrower at any time could monitor if new potential lenders have located within the ad hoc network range, and opt to use a different multiplexer, or use different or additional lenders in a non-multiplexed environment.

However, switching from a multiplexed environment to a non-multiplexed environment may not always be possible, depending on the content of the data being downloaded. For example, the data may be too complex for individual lenders in a non-multiplexed, peer-to-peer bandwidth-sharing arrangement to receive portions of the data from the source. An example of this may be a data stream of a music file. As an illustration, in a multiplexed environment, the multiplexer may have the ability to obtain the data in a stereo format, and 'chunk' the data up into a left signal data stream and a right signal data stream, sending those signals via different lenders in the ad hoc network to the borrower, where the two data streams are recombined into a stereo signal. In a non-multiplexed, peer-to-peer bandwidth-sharing arrangement, the lenders may not be able to access just the left signal data stream and a right signal data stream individually from the source, as the source may not provide the data in a broken-up format. Therefore, a borrower, if using the ad hoc network to download this type of file, may need to reestablish another multiplexer before continuing the download, and may not be able to revert to a non-multiplexed, peer-to-peer bandwidth-sharing arrangement.

Figure 7:
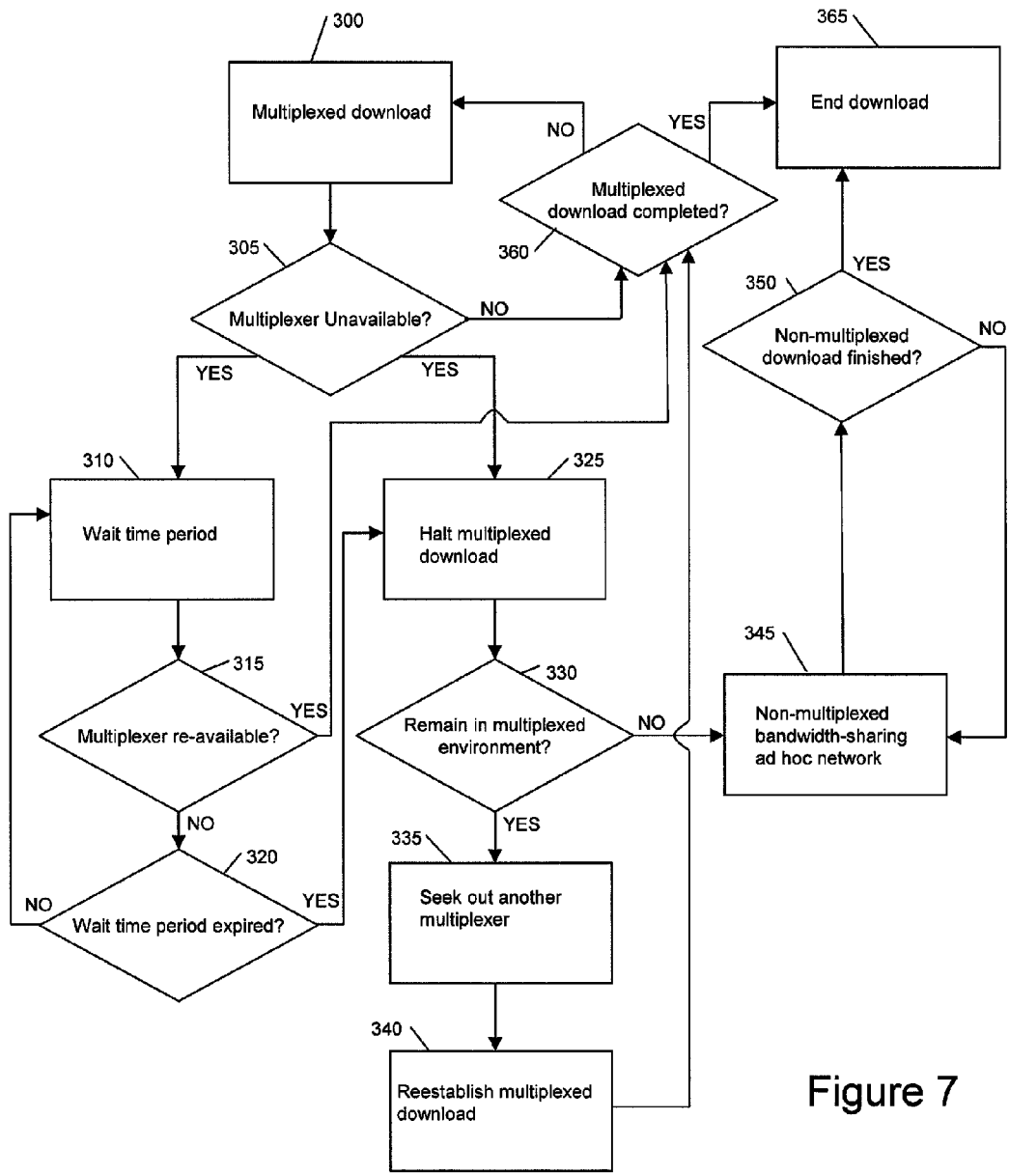
FIG. 7 is a flow chart of steps for implementing aspects of the invention.

FIG. 7 shows a flow chart for the rearrangement of the ad hoc network when a multiplexer may become unavailable. At step 300, a multiplexed download may be underway. This step may indicate the initiation of the multiplexed download or a continuation of the multiplexed download. At step 305, a determination may be made as to whether the multiplexer is unavailable. If the multiplexer remains available, i.e., the multiplexer is available and the download is proceeding, at step 360, a determination of whether the download is complete may be made. If the download is not complete, the process may revert to step 300. If, at step 360, a determination is made that the download is complete, the process may proceed to step 365, where the download is ended.

If, at step 305, a determination is made that the multiplexer is unavailable, a borrower may, at step 325, immediately halt the download, or alternatively, at step 310, wait a grace period (wait a predetermined amount of time, e.g., 5 seconds) for the multiplexer to become available again. At step 315, if a multiplexer becomes available again, the process may proceed to step 360, where a determination of whether the download is complete may be made, as set forth above. If, at step 315, the multiplexer has not become available again, the process may proceed to step 320. At step 320, a determination may be made as to whether the wait time period has expired. If the wait time period has not yet expired, the process may proceed to step 310, where the borrower may continue to wait. If the wait time has expired at step 320, the process may proceed to step 325.

At step 325, the multiplexed download may be halted. While it should be understood that if a multiplexer becomes unavailable, the download may stop because all the downloaded data is passed through the multiplexer, step 325 may be an active decision by the borrower to put the download on hold in order to rearrange the bandwidth-sharing arrangement. At step 330, the borrower may decide to remain in a multiplexed environment, and proceed to step 335, or alternatively the borrower may decide to download in a non-multiplexed environment, at step 345. As set forth above, at step 330, it may not always be possible for a borrower to rearrange the bandwidth-sharing network from a multiplexed environment to a non-multiplexed environment, due to the type of data being downloaded.

At step 335, the borrower may seek out another lender willing and capable to be a multiplexer. This step, in embodiments, may include the borrower looking to the state table for another lender already advertised as willing to act as a multiplexer. (As set forth above, a lender may have already indicated, or advertised, a willingness to act as a multiplexer by filling in the "Node Type" column in the state table with "Multiplexer?".) Additionally, in embodiments, if no other lender has advertised a willingness to act as a multiplexer, the borrower may send a new request for a new multiplexer, in a manner similar to the initial formation of the ad hoc network. This step may include the borrower updating the state table with a flag that a new multiplexer should be found and broadcasting the updated state table, with lenders responding by updating the state table, as described above, possibly with updated prices and associated bandwidth objectives. Additionally, in embodiments, the borrower may entice a lender to act as a multiplexer by offering to pay a higher price to the lender to act as a multiplexer. The borrower selects a new multiplexer to use, at step 340. At this step, the multiplexed download may continue. This step may also include the new multiplexer determining how much of the download is still incomplete and start the data transfer from that point. At step 360, a determination is made as to whether the download is complete, as set forth above.

Alternatively, at step 330, the borrower may decide to proceed to step 345, and may use a non-multiplexed bandwidth-sharing ad hoc network. This step may indicate the initiation of a non-multiplexed download, or a continuation of a non-multiplexed download. The details of establishing a non-multiplexed bandwidth sharing ad hoc network are set forth in application Ser. No. 11/755,808, and the details of forming and rearranging bandwidth sharing ad hoc networks is set forth in application Ser. No. 11/755,775.

At step 350, a determination may be made as to whether the non-multiplexed download is complete. If the non-multiplexed download is not complete, the process may proceed to step 345, where the download may continue. If the non-multiplexed download is complete, the process may proceed to step 365, where the download ends.

Additionally, a multiplexer may already know that it may become unavailable soon and signal its status to the borrower, so that the borrower may proactively rearrange the bandwidth-sharing ad hoc network. In this embodiment, the step of waiting a time period may be unnecessary, as the borrower knows that the multiplexer will not become re-available. Alternatively, a multiplexer that knows they may become unavailable soon may proactively seek out another multiplexer, rather than simply informing the borrower.

It should be understood that while the above examples disclosed a single lender interested in acting as a multiplexer, multiple lenders may be interested in acting as multiplexers, and respond accordingly in the state table. This may occur during the original formation of the bandwidth-sharing ad hoc network, or when a multiplexer becomes unavailable and a borrower seeks out another multiplexer. The potential multiplexers may respond by updating the state table with pricing, available bandwidth, and service level objectives, and the borrower can then select which multiplexer to use—based on price, bandwidth or other service level objective.

Additionally, it should be understood that a multiplexer may also act as a lender, while performing multiplexer duties, as shown in FIG. 3. For example, in addition to sending data portions to lenders, L1 and L2, who then send those portions on to the borrower, B, the multiplexer, MP may send a data portion directly to the borrower, B.

While the invention has been described in terms of embodiments, those skilled in the art will recognize that the invention can be practiced with modifications and in the spirit and scope of the appended claims.

What is claimed is:

1. A method, comprising:
    establishing an ad-hoc network between a borrower and at least two lenders of bandwidth; and
    establishing one lender of the at least two lenders as a multiplexer to manage data flow over the ad-hoc network between the borrower and lenders of the at least two lenders of bandwidth,
    wherein the ad-hoc network is established such that the borrower communicates with the multiplexer via a cellular communication protocol, and the borrower communicates with another one of the at least two lenders via a local wireless communication protocol that is different than the cellular communication protocol;
    the establishing the one lender of the at least two lenders as the multiplexer comprises the borrower designating the one lender of the at least two lenders to act as the multiplexer; and
    the establishing the one lender of the at least two lenders as the multiplexer comprises the borrower transmitting locations of some of the at least two lenders to the multiplexer.

2. The method of claim 1, wherein the multiplexer has a bandwidth that is at least equal to an aggregated bandwidth of lenders of the at least two lenders.

3. The method of claim 2, wherein the multiplexer has a bandwidth greater than an aggregated bandwidth of the lenders of the at least two lenders.

4. The method of claim 1, wherein the multiplexer is configured to connect directly with lenders of the at least two lenders and the borrower.

5. The method of claim 1, wherein the multiplexer is an intelligent device configured to perform multiplexing functions.

6. The method of claim 1, wherein the establishing of the ad hoc network comprises:
    creating a table and broadcasting the table over a network;
    receiving the table in a substantially completed state from the at least two lenders;
    selecting which of the at least two lenders meets established requirements to be the multiplexer based on information in the substantially completed table; and
    requesting the one lender to be the multiplexer.

7. The method of claim 6, wherein the table is updated with information designating that the multiplexer is performing multiplexer functions for the ad hoc network.

8. The method of claim 1, wherein the establishing of the multiplexer is performed in response to a borrower request.

9. The method of claim 1, wherein the establishing of the multiplexer is performed proactively.

10. The method of claim 1, wherein the borrower makes a determination as to whether the one lender meets requirements to be the multiplexer.

11. The method of claim 1, further comprising determining that the established multiplexer is no longer available, or unable or unwilling to perform multiplexing functions.

12. The method of claim 11, wherein the determining is found by not receiving data of the data flow.

13. The method of claim 11, further comprising halting the dataflow after a predetermined period of time has expired.

14. The method of claim 11, further comprising remaining in a multiplexed environment by establishing another lender of the at least two lenders as a new multiplexer.

15. The method of claim 14, further comprising updating a table with a flag that a new multiplexer is requested and broadcasting the updated table, with at least one of the at least two lenders responding by updating the table with a desire to be the new multiplexer.

16. The method of claim 1, wherein the steps of claim 1 are provided by a service provider under a subscription and/or fee agreement and/or based on advertising content to one or more third parties.

17. The method of claim 1, wherein a service provider at least one of creates, maintains, deploys and supports a computer infrastructure that performs the steps of claim 1.

18. A method, comprising:
    establishing an ad-hoc network between a borrower and at least two lenders of bandwidth by broadcasting a table to the at least two lenders;
    requesting one of the at least two lenders to be a multiplexer to manage data flow over the ad-hoc network based on required criteria; and
    establishing the one of the at least two lenders as the multiplexer based on information provided by the at least two lenders which meets the required criteria,
    wherein the ad hoc network is established such that the borrower communicates directly with another lender of the at least two lenders via a local wireless communication protocol;

the ad hoc network is configured for the borrower and the other lender to communicate with the multiplexer via a cellular communication protocol that is different than the local wireless communication protocol;

the establishing the one of the at least two lenders as the multiplexer comprises the borrower designating the one of the at least two lenders to act as the multiplexer; and the establishing the one of the at least two lenders as the multiplexer comprises the borrower transmitting locations of some of the at least two lenders to the multiplexer.

19. The method of claim 18, wherein the multiplexer has a bandwidth that is at least equal to an aggregated bandwidth of lenders of the at least two lenders.

20. The method of claim 19, wherein the multiplexer has a bandwidth greater than an aggregated bandwidth of the lenders of the at least two lenders.

21. The method of claim 18, wherein the multiplexer is an intelligent device configured to perform multiplexing functions.

22. The method of claim 18, wherein the table is updated with information designating that the multiplexer is performing multiplexer functions for the ad hoc network.

23. The method of claim 18, wherein the establishing of the multiplexer is performed in response to a borrower request or proactively.

24. The method of claim 18, further comprising determining that the established multiplexer is no longer available, or unable or unwilling to perform multiplexing functions.

25. The method of claim 24, further comprising remaining in a multiplexed environment by establishing another lender of the at least two lenders as a new multiplexer.

26. The method of claim 25, further comprising updating the table with a flag that the new multiplexer is requested and broadcasting the updated table, with at least one of the at least two lenders responding by updating the table with a desire to be the new multiplexer.

27. The method of claim 18, wherein the steps of claim 18 are provided by a service provider under a subscription and/or fee agreement and/or based on advertising content to one or more third parties.

28. The method of claim 18, wherein a service provider at least one of creates, maintains, deploys and supports a computer infrastructure that performs the steps of claim 18.

29. A method for providing a formation of a multiplexed ad-hoc network, comprising:

providing a computer infrastructure being operable to:

establish an ad-hoc network between a borrower and at least two lenders of bandwidth by broadcasting a table to the at least two lenders;

request one of the at least two lenders to be a multiplexer to manage data flow over the ad-hoc network; and establish the one of the at least two lenders as the multiplexer based on required criteria provided by the borrower, wherein the ad hoc network is established such that the borrower communicates directly with another lender of the at least two lenders via a local wireless communication protocol;

the ad hoc network is configured for the borrower and the other lender to communicate with the multiplexer via a cellular communication protocol that is different than the local wireless communication protocol;

the establishing the one of the at least two lenders as the multiplexer comprises the borrower designating the one of the at least two lenders to act as the multiplexer; and the establishing the one of the at least two lenders as the multiplexer comprises the borrower transmitting locations of some of the at least two lenders to the multiplexer.

30. The method of claim 29, wherein the establishing the multiplexer is based on information provided by the at least two lenders which meets the required criteria.

31. The method of claim 29, wherein the multiplexer has a bandwidth that is at least equal to or greater than an aggregated bandwidth of lenders of the at least two lenders.

32. The method of claim 29, wherein the establishing of the multiplexer is established in response to a borrower request or proactively.

33. The method of claim 29, further comprising determining that the established multiplexer is no longer available, or unable or unwilling to perform multiplexing functions and remaining in a multiplexed environment by establishing another lender of the at least two lenders as a new multiplexer.

34. The method of claim 32, further comprising updating the table with a flag that a new multiplexer is requested and broadcasting the updated table, with at least one of the at least two lenders responding by updating the table with a desire to be the new multiplexer.

35. A system comprising a server having a database containing data associated with one or more lenders and a borrower in an ad-hoc network, and at least one of a hardware and software component for establishing an ad-hoc network between a borrower and at least two lenders of bandwidth by broadcasting a table to the at least two lenders; requesting one of the at least two lenders to be a multiplexer to manage data flow over the ad-hoc network based on required criteria; and establishing the one of the at least two lenders as the multiplexer based on information provided by the at least two lenders which meets the required criteria, wherein the ad hoc network is established such that the borrower communicates directly with another lender of the at least two lenders via a local wireless communication protocol;

the ad hoc network is configured for the borrower and the other lender to communicate with the multiplexer via a cellular communication protocol that is different than the local wireless communication protocol;

the establishing the one of the at least two lenders as the multiplexer comprises the borrower designating the one of the at least two lenders to act as the multiplexer; and the establishing the one of the at least two lenders as the multiplexer comprises the borrower transmitting locations of some of the at least two lenders to the multiplexer.

36. The system of claim 35, wherein the at least one of a hardware and software component is configured to: determine that the multiplexer is no longer available, or unable or unwilling to perform multiplexing functions; and establish another lender of the at least two lenders as a new multiplexer.

37. The system of claim 35, wherein a service provider at least one of creates, maintains, deploys and supports the at least one of a hardware and software component.

38. The system of claim 35, wherein the at least one of a hardware and software component resides on a server provided by a service provider.

39. A computer program product comprising a computer usable medium having readable program code embodied in the medium, the computer usable medium being an apparatus that stores the program code, the computer program product includes at least one component to:

establish an ad-hoc network between a borrower and at least two lenders of bandwidth; and establish one lender of the at least two lenders as a multiplexer to manage data flow over the ad-hoc network between the borrower and lenders of the at least two lenders of bandwidth, wherein the ad hoc network is established such that the borrower communicates directly with another lender of the at least two lenders via a local wireless communication protocol;

the ad hoc network is configured for the borrower and the other lender to communicate with the multiplexer via a cellular communication protocol that is different than the local wireless communication protocol;

the establishing the one lender of the at least two lenders as the multiplexer comprises the borrower designating the one lender of the at least two lenders to act as the multiplexer; and the establishing the one lender of the at least two lenders as the multiplexer comprises the borrower transmitting locations of some of the at least two lenders to the multiplexer.

* * * * *